United States Patent
Zarka et al.

(10) Patent No.: US 11,381,422 B2
(45) Date of Patent: Jul. 5, 2022

(54) METHOD TO WRITE REQUESTS ON A VEHICLE DIAGNOSTIC BUS

(71) Applicant: MUNIC, Villejuif (FR)

(72) Inventors: Julien Zarka, Paris (FR); Cyprien Debu, Villejuif (FR)

(73) Assignee: MUNIC, Villejuif (FR)

( * ) Notice: Subject to any disclaimer, the term of this patent is extended or adjusted under 35 U.S.C. 154(b) by 0 days.

(21) Appl. No.: 16/499,934

(22) PCT Filed: Apr. 25, 2017

(86) PCT No.: PCT/IB2017/000662
§ 371 (c)(1),
(2) Date: Oct. 1, 2019

(87) PCT Pub. No.: WO2018/197922
PCT Pub. Date: Nov. 1, 2018

(65) Prior Publication Data
US 2021/0111923 A1    Apr. 15, 2021

(51) Int. Cl.
*G06F 13/374* (2006.01)
*H04L 12/40* (2006.01)
*G06F 13/40* (2006.01)

(52) U.S. Cl.
CPC ...... *H04L 12/40169* (2013.01); *G06F 13/374* (2013.01); *G06F 13/4068* (2013.01);
(Continued)

(58) Field of Classification Search
CPC ......... H04L 12/40169; H04L 12/40013; H04L 12/4015; H04L 2012/40215; H04L 2012/40273; G06F 13/374; G06F 13/4068
See application file for complete search history.

(56) References Cited

U.S. PATENT DOCUMENTS

| 2010/0023198 A1 | 1/2010 | Hamilton |
| 2010/0100277 A1* | 4/2010 | Blythe ............... G01C 22/02 701/31.4 |

(Continued)

OTHER PUBLICATIONS

International Search Report for PCT/IB2017/000662, dated Jul. 19, 2017, 5 pages.

*Primary Examiner* — Henry Tsai
*Assistant Examiner* — Harry Z Wang
(74) *Attorney, Agent, or Firm* — Dority & Manning, P.A.

(57) ABSTRACT

A method carried out in a system, the system comprising at least a diagnosis plug-in device (1) connected to the diagnosis plug (8) of a vehicle, a host server (2), one or more on-board ECUs (3), the method comprising the following steps: /a/ detect a Bus Active condition, either via an electrical pin on the diagnosis plug or via an analysis of activity level on at least one Diagnosis bus accessible at the diagnosis plug, /b/ cause the diagnosis plug-in device to listen only on the at least one Diagnosis bus after the Bus Active condition is detected, /c/ determine a write enable condition, according to evolution of bus load level on the at least one diagnosis bus and/or after a certain time elapsed since Bus Active condition was true, /e/ whenever the write enable condition becomes true, carry out the request/answer services to write requests on the diagnosis bus and retrieve, in the corresponding answers, various data from the board ECUs (3), to be decoded and forwarded to a client fleet management system, /e1/ determining, a cyclic pattern of messages circulating on the bus, with at least busy instants (IB) and quiet instants (IQ), /e2/ place write requests on the diagnosis bus at quiet instants (IQ).

19 Claims, 4 Drawing Sheets

(52) U.S. Cl.
CPC .... *H04L 12/40013* (2013.01); *H04L 12/4015* (2013.01); *H04L 2012/40215* (2013.01); *H04L 2012/40273* (2013.01)

(56) References Cited

U.S. PATENT DOCUMENTS

| | | | | |
|---|---|---|---|---|
| 2010/0205450 | A1* | 8/2010 | Sarnacke | B60R 25/00 713/185 |
| 2012/0041636 | A1* | 2/2012 | Johnson | G06F 11/3466 701/31.4 |
| 2012/0053778 | A1* | 3/2012 | Colvin | G06F 11/079 701/29.4 |
| 2012/0078501 | A1* | 3/2012 | Haleem | G06F 1/3206 701/408 |
| 2012/0215754 | A1* | 8/2012 | Marzani | G06Q 50/30 707/705 |
| 2013/0268156 | A1 | 10/2013 | Schumann et al. | |
| 2013/0282227 | A1 | 10/2013 | Chen et al. | |
| 2014/0309864 | A1* | 10/2014 | Ricci | G01C 21/365 701/36 |
| 2014/0371977 | A1* | 12/2014 | Sumi | G07C 5/008 701/31.5 |
| 2016/0269225 | A1 | 9/2016 | Kirchmeier et al. | |
| 2016/0297398 | A1* | 10/2016 | Jefferies | G07B 15/00 |
| 2017/0039784 | A1* | 2/2017 | Gelbart | G07C 5/0808 |
| 2017/0294059 | A1* | 10/2017 | Noyelle | H04L 67/26 |

* cited by examiner

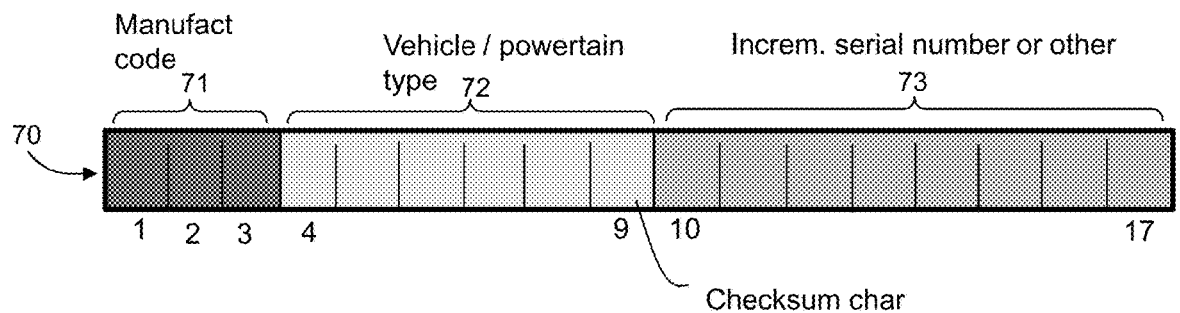
FIG. 3   VIN breakdown
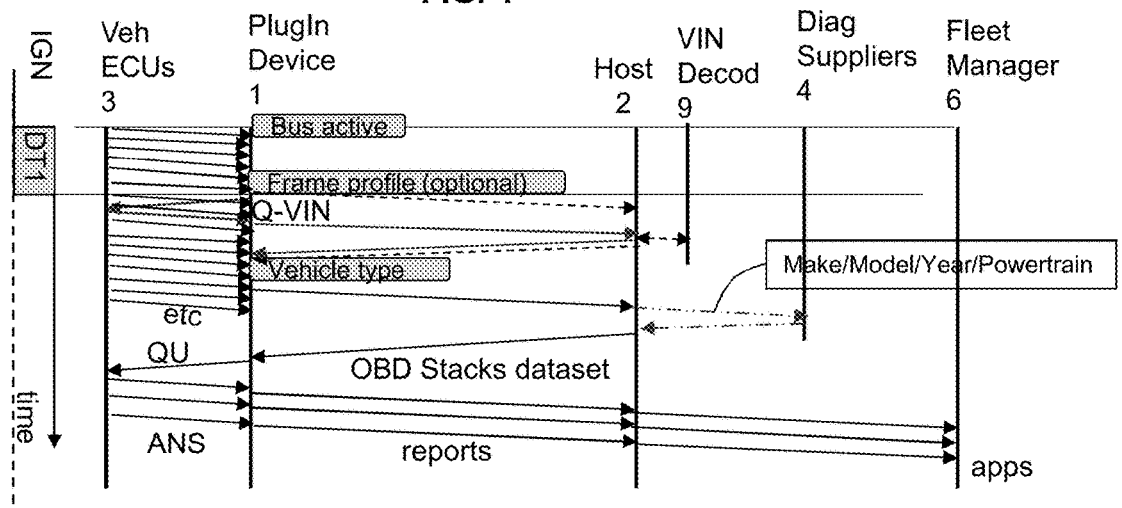
FIG. 4
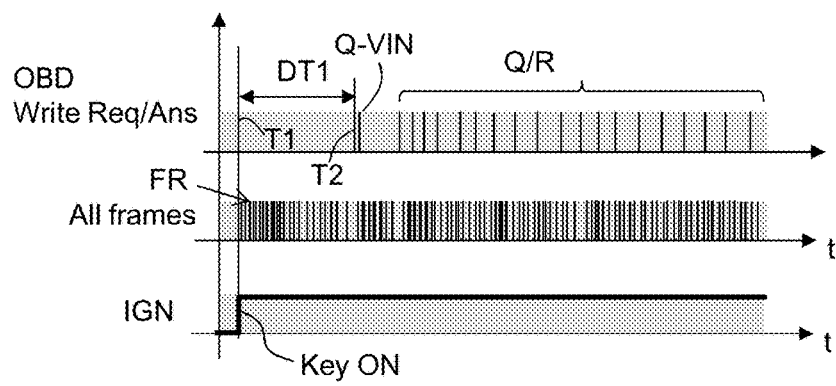
FIG. 5

OBD Plug-In Device

US 11,381,422 B2

METHOD TO WRITE REQUESTS ON A VEHICLE DIAGNOSTIC BUS

FIELD OF THE INVENTION

The present invention relates to methods to write requests on a vehicle diagnosis bus. This kind of method is used by a diagnosis plug-in device designed and configured to collect various static and dynamic data on rolling vehicles and to transmit this data wirelessly to one or more remote server(s). Such diagnosis plug-in device (otherwise called OBD plug-in device) is coupled to the diagnose plug port/connector of the vehicle and collect various static and dynamic data from onboard ECUs (Electronic Control Unit) by the use of request/answers services.

BACKGROUND OF THE DISCLOSURE

There is an increasing need to collect information about motor vehicles, either for fleet management, insurance personalized charge policy, traffic jam management, or other purposes.

One popular solution to remotely collect and transmit various data like vehicle speed, fuel consumption, vehicle geolocation, etc., is to add a plug-in device that can be plugged into the OBD plug (sometimes called OBDII plug/port/connector or Diagnose plug port/connector which form a communication interface). The diagnosis plug-in device ('Diag plug in Device in short) is sometimes called 'Dongle' or 'dongle unit'. The desired data is collected using messages on a serial bus (often CAN bus or J1850 or J1708 or Ethernet or sometimes K-line). Each vehicle manufacturer has its own messages definition. Practically, even each technical platform have its own messages definition (several commercial variants may be derived from one technical platform).

A subset of services (question/answers) is defined by a OBD standard ISO 15031. This minimal subset originates from pollution monitoring purposes. Additional services may be available in the standard or Out of the standard.

These services are used in garage/maintenance environment by a device called "diagnosis tool" otherwise called "Scan Tool". In most cases, the diagnosis tool is used when the vehicle is at null speed, i.e. in a repair shop. Such diagnosis tool is plugged momentarily only.

According to another standpoint, the multiplex bus system is a success and recently bus loads has undergone a trend to increase a lot. In many configurations, particularly the up-to-date configurations, the bus used by the diagnosis tool to access onboard ECUs is a bus where prevail many free running frames broadcasted by various onboard ECUs whenever they are active. This free running broadcasted frames represent a significant load on the bus.

Practically, CAN bus is the foremost bus serving as diagnosis bus, whereas other types of bus are also used.

However, it is admitted that a load of 50% for CAN bus is the limit beyond which collision rate become significant and can entail delays in the transmission of some messages.

Therefore, when using a diagnosis plug-in device to retrieve data on the diagnosis bus, notably if this requires to use request/answer services, this tends to increase the bus load of the diagnosis bus. The inventors have endeavored to mitigate this effect, which is the purpose of the present disclosure.

SUMMARY OF THE DISCLOSURE

According to one aspect of the present invention, it is disclosed a method carried out in a system, the system comprising at least a diagnosis plug-in device (1) a host server (2), one or more on-board ECUs (3), the method comprising the following steps:

/a/ detect a Bus Active condition, either via an electrical pin on the diagnosis plug ('Key On') or via an analysis of activity level on at least one Diagnosis bus accessible at the diagnosis plug, /b/ cause the diagnosis plug-in device to listen only on the at least one Diagnosis bus after the Bus Active condition is detected, namely in a passive mode, /c/ determine a write enable condition, according to evolution of bus load level (on the diagnosis bus) and/or after a certain time elapsed since Bus Active condition was true, /e/ whenever the write enable condition becomes true, carry out the request/answer services to write requests on the diagnosis bus and retrieve, in the corresponding answers, various data from the board ECUs (3), to be decoded and forwarded to a client fleet management system.

Thanks to these dispositions, messages broadcasted from the board ECUs are not disturbed by the presence of the diagnosis plug-in device which remains mute during a certain time after activation of the bus. There may be some initialization processes between different ECUs that take place just after bus activation, and these initialization processes needs not be disturbed by extraneous request services that might placed on the bus by some diagnosis plug-in device.

In various embodiments of the invention, one may possibly have recourse in addition to one and/or other of the following arrangements.

According to one particular option, the method may further comprise:

/e1/ determining, on a short term basis, a cyclic pattern of messages circulating on the bus, with at least busy instants and quiet instants /e2/ place write requests on the diagnosis bus at quiet instants, preferably only at quiet instants and not at busy instants.

Advantageously, a short term analysis of messages circulating in the bus leads to the determination of short term cyclic pattern; thus, the normal operation of the bus used for diagnosis is not disturbed by the request/answers carried out by the diagnosis plug-in device; said otherwise the rate of collisions is not increased despite the additional requests/answers emanating from the diagnosis plug-in device.

According to one particular option, the method may be such that, at step /e/ and/or at step /e1/ and /e2/, request/answer services are carried out with a strategy which is contextual to current speed of the vehicle.

Thus, write enable condition can be set according to context; slowing down or disabling write when vehicle speed >50 Km/h; slowing down write rate as long as the vehicle speed increases;

According to one particular option, the method may further comprise:

/d1/ determining vehicle type, and defining therefrom a firewall filter, said firewall filter being subsequently used at step /e/ to inhibit certain request/answer services.

Thereby, according to the relevant vehicle type(s), some request(s), which are known to be detrimental to the proper operation of the bus (or detrimental to the proper operation of some functions vehicle), are not used and eliminated by the firewall filter.

According to one particular option, the method may further comprise:

/d2/ determine vehicle type, wherein the write enable condition is disabled for certain particular vehicle type.

Vehicle with known problem are handled by a listen-only mode, or only at null speed. Ineligibility to write requests can be declared according to VIN or vehicle type.

According to one particular option, the method may further comprise:

/d3/ determine vehicle type, namely Make/Model/Year/Powertrain,

/d4/ provide a database of overall bus load reference overall timecharts per vehicle type, each timechart exhibiting eras of low bus load and eras of high bus load, /d5/ write requests at moments when the bus load is of low bus load;

High and low bus load eras are known "in advance" on a microscopic basis; thereby there is no need to proceed to real time analysis.

thereby there is no need to 'manual' input of vehicle type, automatic recognition of vehicle type is done.

Advantageously the normal operation of the bus used for diagnosis is not disturbed by the request/answers carried out by the diagnosis plug-in device; said otherwise the rate of collisions is not increased despite the additional request answer from the diagnosis plug-in device. Time charts are established beforehand; there is less need to monitor or short-term cyclic patterns in that case.

According to one particular option, the step of determining vehicle type is made either from a VIN retrieved from the bus and/or from a frame profile determined according to characteristics of the received frame-IDs on the diagnosis bus;

When the VIN is easily accessible, vehicle type is easy to determine; however, even though VIN is not available, the diagnosis plug-in device can correctly handle communication with the available request/answer services.

According to one option, the diagnosis bus of interest is a CAN-type bus, at a bit rate of 250 kbits/s or 500 kbits/s.

CAN-type bus tends to be standard, with an increasing number of messages circulating on the bus, with a busload generally comprised between 10% and 50%.

According to another option the diagnosis bus of interest can be FDCAN or Ethernet.

According to one option, the method may be such that the write enable condition is set to be true after a first period of time since Bus Active condition was true, and the first period of time DT1 is predefined and comprised between 1 s and 20 s, preferably between 3 s and 10 s.

Determining the frame profile by listening on the CAN bus requires few time.

According to one option, the method may be such that a Bus Active condition is determined to be true when, on at least one accessible bus, a mean number of frames per time unit increases more than a first predefined threshold.

This method enables to recognize the activation of the diagnosis bus, irrespective of electrical conditions and irrespective of various functional sequences, and irrespective of powertrain type (electric, hybri . . . ).

According to a further option, the method may be such that a Bus Active condition is determined to become false, wherein a mean number of frames per time unit is lower than a second predefined threshold. Therefore, the diagnosis plug-in device can stop placing write requests as soon as the bus is shutdown, including if the engine control unit is operating under Power latch phase after the engine has been stopped.

The present invention also targets a OBD plug in device, configured to carry out the method set out above.

The present invention also targets a system, including the OBD plug in device, the host server configured to carry out the method set out above.

BRIEF DESCRIPTION OF THE DRAWINGS

Other features and advantages of the invention appear from the following detailed description of one of its embodiments, given by way of non-limiting example, and with reference to the accompanying drawings, in which:

FIG. 3 illustrates a decomposition of the VIN number, FIG. 4 shows a chart illustrating various messages exchanged to try and retrieve the VIN number, FIG. 5 shows a timing chart exhibiting the messages circulating on the BUS after "key on"

DETAILED DESCRIPTION OF THE DISCLOSURE

In the figures, the same references denote identical or similar elements.

Figure 1:
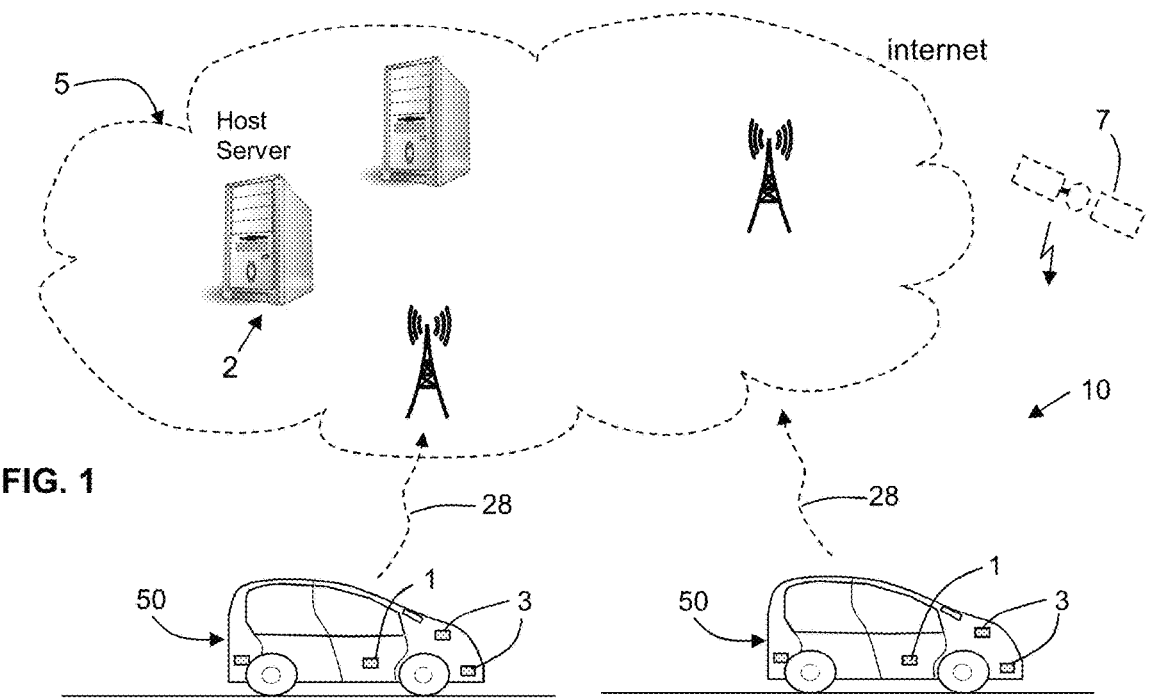
FIG. 1 illustrates a general overview of a system in which the Diag PlugIn devices according to the present disclosure are used.
Figure 2:
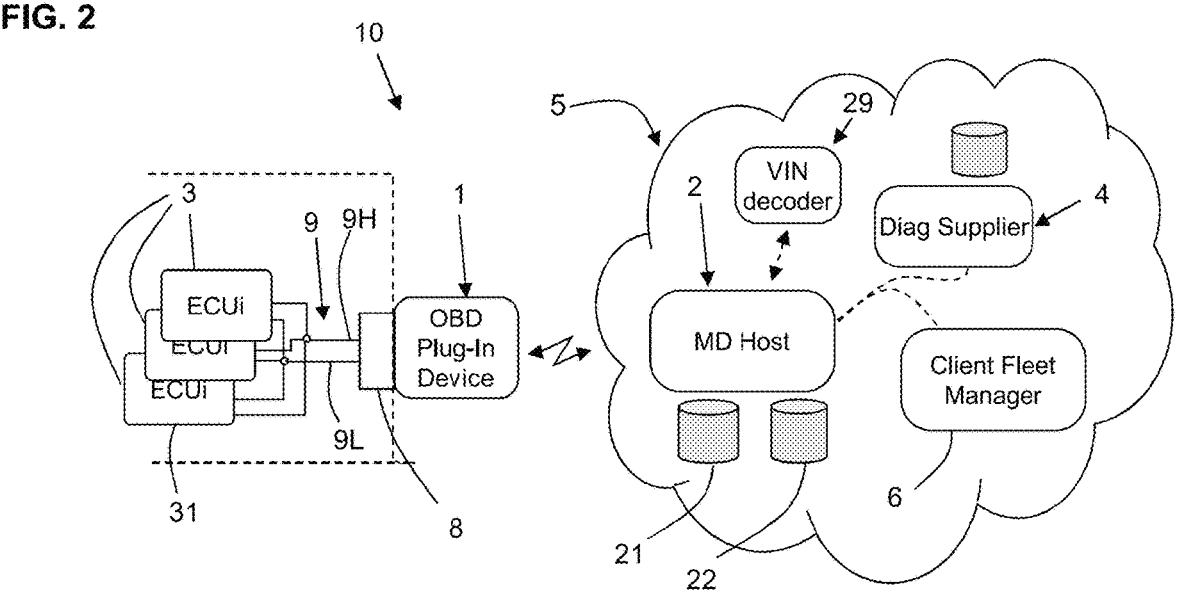
FIG. 2 shows a block diagram of a system in which the Diag PlugIn device according to the present disclosure are used.
Figure 6:
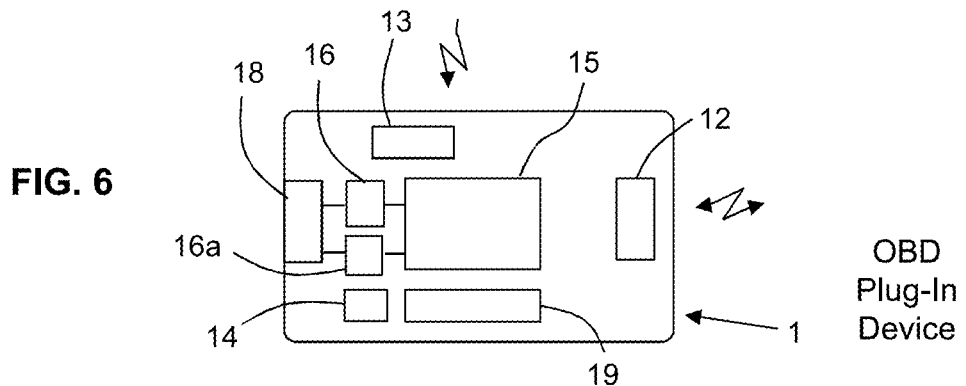
FIG. 6 shows an exemplary block diagram of the Diag PlugIn device.

FIG. 1 shows an exemplary system 10 in which are used Diagnosis PlugIn devices generally designated by reference numeral 1.

A large number of vehicles 50 are to be equipped with such plug-in devices; in practice one diagnosis plug-in device is installed on one targeted vehicle. All plug-in devices are identical before being installed on one particular vehicle. They are also referred to as "universal dongle".

Targeted vehicles include any type of usual vehicles, namely sedans, trucks, convertibles, heavyweight vehicles, station wagons and so on. Any brand/make is taken in consideration. Also motorcycles are taken in consideration.

In addition, any type of powertrain solution is considered such as ICE (internal combustion engine), hybrid, full electric . . . .

With reference to FIGS. 1 to 8, each of the targeted vehicle is equipped with on-board ECUs 3 and a diagnostics port 8 otherwise named OBD plug 8 or OBD connector. "OBD" stands for On Board Diagnostics. For heavyweight vehicles, motorcycles or some old passenger vehicles, the diagnostics port 8 is not necessarily called "OBD port", it is generally a diagnostics port where a diagnostic tool ('Scan tool') can be momentarily coupled, notably for vehicle maintenance purpose.

In many configurations, particularly the up-to-date configurations, the bus used by the diagnosis tool to access onboard ECUs is a bus where prevail many free running frames FR broadcasted by various onboard ECUs whenever they are active. This free running broadcasted frames FR represent a significant load on the bus.

Practically, CAN bus is the foremost bus serving as diagnosis bus.

However, it is admitted that a load of 50% for CAN bus is the limit beyond which collision rate become significant and can entail delays in the transmission of some messages.

At one moment in the service life of the vehicle 50, a Diagnosis PlugIn device 1 is plugged onto the OBD port 8.

Each Diagnosis PlugIn device 1 has wireless communication capability, with 3G, 4G, LTE, GPRS standards or any like solution. There is provided a wireless coupler 12, a microcontroller 15, a male connector 18. In most passenger vehicles, the connector 18 is a complementary counterpart of the OBD port defined by SAE J1962. For heavyweight vehicles, since there is no standard for the diag connector, there is provided another method to establish the communication between the Diagnosis PlugIn device 1 and the vehicle diagnosis bus, namely a coil/wire coupling. Therefore, coupling Diagnosis PlugIn device 1 to vehicle diagnosis bus can be done either by a conventional electrical contact fashion, or by a contactless coil/wire coupling.

This wireless communication 12 enables the Diagnosis PlugIn device 1 to exchange data with a host server 2 which is located in one location remote from the vehicle, thanks to the wireless network flexibility.

In addition, the host server 2 is connected on the internet network, denoted by 5. There may be wired and wireless portions in the internet network.

Each Diagnosis PlugIn device 1 has at least a CAN bus interface 16, enabling to listen to at least one CAN bus 9 of the vehicle.

In a particular case of the powertrain Can bus, there are two lines CAN-High 9H and CAN-Low 9L (cf FIG. 2) as defined in ISO 15765. The pinout of the OBD plug 8 is predefined, according to standard SAE J1962, it comprises 16 pins with particular allocation.

Instead of CAN high speed, the interface between Diag PlugIn device 1 and on-board ECUs 3 can be made through J1939, CAN 250 k, CAN single Line, K line ISO 9141, J1850 or Ethernet or other equivalent means. There may be provided two or more communication interfaces 16, 16a.

Since the Diagnosis PlugIn device 1 is intended to be 'universal', it contains cumulatively hardware/firmware/protocol handler for all the possible cases namely, CAN High speed, J1939, CAN 250 k, CAN single Line, K line ISO 9141, J1850, Ethernet, etc.

For CAN High speed, it is referred to ISO 15765-4; for K-line, it is referred to the so called KWP2000.

In addition, optionally, each Diagnosis PlugIn device 1 may have a geolocation functionality 13, based on signal acquisition from GPS satellites 7 or the like, and calculation of geo position, as known per se.

Each Diag PlugIn device 1 may have an accelerometer 14, in complement to GPS in order to sense the vehicle movement.

Each Diag PlugIn device 1 may comprise a backup battery 19 to allow storage of essential data whenever the vehicle battery is disconnected or whenever the Diagnosis PlugIn device 1 is disconnected momentarily. The Diagnosis PlugIn device 1 is intended to generally stay connected to the OBD plug 8, unlike the garage scan tool, which is plugged on the OBD plug only momentarily.

Each vehicle 50 comprises one or more on-board ECUs 3 with diagnostics functionality. One ECU (Electronic Control Unit) 31 may be in charge of ICE control including gases emissions control, another ECU may be in charge of braking/ABS/ESP functions, another ECU may be in charge of passive safety functions including airbags, another ECU may be the instrument panel with odometer and gauges, another ECU may be in charge of various body functions etc. . . . . .

For Hybrid/electric vehicles, the engine ECU is substituted by an enlarged concept, namely a "powertrain" ECU.

Each vehicle 50 has a unique VIN number 70. This number consists of 17 symbols, namely 17 characters, letter or numeral, as illustrated on FIG. 3.

Normally the VIN number complies with ISO 3779 standard. However, there may be deviations or even errors in the VIN. Retrieval of VIN requires asking on the bus, namely placing a write request on the bus. VIN is not available on the free running broadcasted frames.

First section 71 (3 char.) denotes the vehicle manufacturer. Second section 72 (6 char.) denotes the body type and the powertrain type. Third section 73 (8 char.) is less rigid and may denote a serial incremental number.

In the system 10, there are also provided one or more diagnostics database suppliers 4, connected to the Internet 5.

Diagnostics database suppliers 4 can be private specialized companies, diagnostics database suppliers 4 can also be one service provided by the vehicle manufacturer itself like Ford, VW, Toyota, Nissan, GM, Renault, FIAT, BMW, Volvo, etc. . . . . .

Diagnostics database suppliers 4 knows, for each technical platform from several manufacturers, the set of available diag services, which are otherwise designated by "Diagnosis stacks dataset". The host server 2 may have recourse to several diagnostics database suppliers whenever the data is not available on one of them, the host server 2 turns to another one.

Diagnosis stacks dataset define access methods, useful bus(es) and available diag services, with their respective codes, controls, expected answers with decoding scheme. ISO 15031 defines the minimum services and questions/answers that have to be supported.

Said otherwise, Diagnosis stacks dataset comprises all available request/answer services for this particular "vehicle type" (see definition below), and the hardware access method.

Vehicle type can be discovered with the help of the VIN number; however, vehicle type VT can also be discovered with the help of a "diag frame profile" otherwise called "frame profile" that will be explained later.

There is defined a "vehicle type" VT being defined at least by the following information: Make, Model, Year, Powertrain of the vehicle of interest. Practically, this information substantially corresponds to a manufacturer technical platform and substantially corresponds to the 9 first characters of the VIN number.

"Make" is the manufacturer like FORD. "Mode" 1 is the vehicle model like FOCUS. "Year" is the manufacturing date of this vehicle like 2015. "Powertrain" is a code for the engine type and the transmission type (either manual, automatic, hybrid) like DV4 MP6 for instance. Regarding "engine" field, it encompasses engine type, ICE displacement, fuel type, etc. . . . . .

Generally speaking, various information collected thanks to the plug-in devices 1 are transmitted to one or more client fleet management server 6.

Preferably all the following items are connected together through the internet network 5: host server 2, diagnostics database suppliers 4, client fleet management server 6, a VIN decoder service 29.

More precisely, various information collected thanks to the plug-in devices 1 are transmitted wirelessly to the host server 2, in raw or decoded fashion. For some cases, decoding has to be done in the server(s) of the diagnostics database suppliers 4.

The decoded information is then transmitted to the client fleet management server 6. The fleet manager can therefrom perform various tasks of management of operation/maintenance/deliveries & missions; whenever the fleet manager is an insurance company, the proposed method also enables accurate collection of actual use for insurance financial charges.

According to one option, geolocation information is not transmitted to diagnostics database suppliers.

Figure 8:
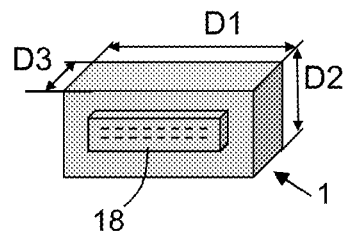
FIG. 8 illustrates the mechanical configuration of the Diag PlugIn device.

As apparent from FIG. 8, the plug-in device 1 is very small, typically less than 50 mm thick (D3) with regard to the length D1 and width D2 of the OBD plug. It is intended to be installed in a very small volume next to the OBD plug.

Small dimensions of the OBD plug-in device 1 can be D1<50 mm, D2<25 mm, D3<50 mm.

Diagnosis plug-in device 1 has preferably no display, no user interface, preferably no switch. Diagnosis plug-in device 1 may bear an identification label for quality and traceability purposes. Diagnosis plug-in device 1 may have a Bluetooth or NFC interface. Diagnosis plug-in device 1 may have a micro USB port.

Detection of Bus Active and Diag Frame ID Determination (Frame Profile)

After installation of the plug-in device 1, i.e. coupling to the onboard buses, the plug-in device listens all possible sources/pins and receives frames broadcasted by onboard ECUs on at least one Diagnosis bus.

If the vehicle is not used (engine stopped, doors locked, . . . ), the communication bus(es) are inactive. When the vehicle is on use, (engine usually running, motion, etc. . . . ) communication bus(es) are active. There are transitions, one from inactive to active when starting a cycle of use of the vehicle, one from active to inactive when ending the cycle of use of the vehicle; there may be intermediate states in the transitions eras; there mays be different type of active states according to some operating conditions.

In the example illustrated on FIGS. 4 and 5, just after "key on", otherwise said "Ignition ON" on the ignition switch, various on-board ECUs 3 start sending messages FR on the Diag bus (CAN bus or other) also accessible on the Diag port 8, on broadcast mode.

More generally speaking, the "Ignition ON" can be broadened to a "Bus Active" condition. On some vehicles, activation of one or more bus(es) may coincide with door unlocking, driver door opening, or other condition. Therefore, the "Bus Active" condition is more relevant than simply Key On.

Engine crank and engine effective start can cause electric disturbances for which the bus may undergo some disturbances, due to possible reset of some ECUSs.

Generally speaking a Bus Active condition can be determined when, on at least one bus, a mean number of frames per time unit increases more than a predefined threshold.

For instance, this predefined threshold can be set to 20 messages/sec/sec or 50 messages/sec/sec.

Determination of "Frame Profile"

Each broadcasted message is characterized by a header named "Frame-ID"; each message is repeated periodically at a predefined frequency; each message is characterized by a length (up to 8 bytes for CAN standard), which is characterized by a number called DLC (Data Length Code).

Each vehicle manufacturer has its own messages definition. Practically, even each technical platform have its own messages definition (several commercials variants may be derived from one technical platform).

An entity named "frame profile" characterizes each technical platform. Listen to all frames circulating on the bus helps to define such frame profile entity.

Note: "frame profile" can also be called "diag frame signature" or "diag fingerprint".

An example of basic frame profile can be a collection of pairs (frame ID, frequency, DLC).

One example is given here: (7B hexa, 20 ms, 6), (A3 hexa, 100 ms, 8), (92 hexa, 100 ms, 8), (11A hexa, 60 ms, 5).

Payloads and other information can also be taken into account in a refined upgraded frame profile entity, otherwise called complementary frame profile.

Particularly payload for each frame, ordered sequence of frames, time interval between some particulars frames, are used to define an upgraded frame profile.

Additionally, "invariant" portions in payloads may be identified and stored in an upgraded frame profile; also toggling between two discrete values can be added to such upgraded frame profile.

There may be provided a hybrid definition of frame profile which includes a first sub profile with IGN On (but engine Off), and a second sub profile with Engine On.

Advantageously, in the proposed method, sporadic frames are discarded and disregarded in the overall analysis On Can bus, Frame ID is encoded on 11 bits in the basic address scheme, and on 29 bits on the extended address scheme. In the case of J1850, there are also Frame IDs and header of the frames. Similar header characteristics are defined for other types of bus.

As long as the diag plug-in device 1 remains silent on the bus (listen only mode), this phase is called "passive time"; the duration of this passive phase is DT1.

According to one option, the predefined period of time DT1 is comprised between 1 s and 20 s, preferably between 3 s and 10 s, ideally around 6 s.

According to one option, the period of time DT1 is adjusted according to collected Frame IDs on the bus.

VIN Retrieval

After first Bus active condition is verified, and optionally after some time in listen only mode, the OBD plug-in device 1 writes a request on the bus to retrieve the VIN number. This service is called "Q-VIN" in the present specification.

Normally, the VIN number is returned by one of the on-board ECUs 3. The diag plug-in device 1 then forwards the retrieved VIN number to the Host server 2.

At this point, the host server 2 checks the checksum of the retrieved the VIN number.

If the VIN format is OK, particularly the first section 71 and the second section 72, the host server determines vehicle type. The host server 2 may determine vehicle type internally according to a look-up table if this entry available is available therein. In the other case, the host server 2 may use the service of a VIN decoder server 9.

If the VIN is lacking, the host server determines vehicle type according to the above mentioned frame profile.

Then, the Host server 2 sends issues a request with Make/Model/Year/Powertrain to the diagnostics database supplier 4 to get back in return the diagnosis stacks dataset, as defined above.

Repetitive Requests ("Cruise" Operation)

When the diagnosis stacks dataset is available to the diagnosis plug-in device 1, the latter issue repeated requests QU to retrieve interesting data the like mileage, fuel level, instant speed, average speed, geo location, various vehicle status information, etc. . . . .

The raw answers are denoted by "ANS" on FIG. 4; whenever the diagnosis stacks dataset is open and contains encoding/decoding information, the diagnosis plug-in device 1 decodes the raw data and send "reports" 28 to the Host server 2 which in turn forwards it to the Fleet manager 6 with exploitable data in clear, like mileage, fuel level, instant speed, average speed, geo location, various vehicle status information.

Fleet manager 6 gathers information from the great number of vehicles, the fleet manager 6 handles various applications relating to the vehicle operation.

According to a particular case, the plug-in device 1 sends raw data to the Host server 2 which in turn forwards this raw data to the diagnostics database suppliers 4, which decodes raw data and sends back decoded data to the Host server 2 which in turn forwards this decoded data to the fleet manager server 6.

Passive Mode after Bus Active

Figure 7:
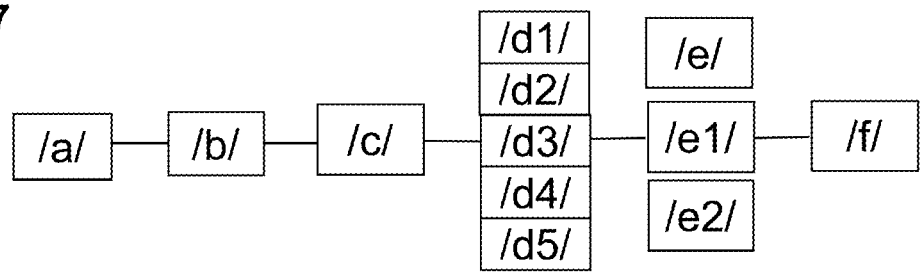
FIG. 7 illustrates the steps of the method.
Figure 9:
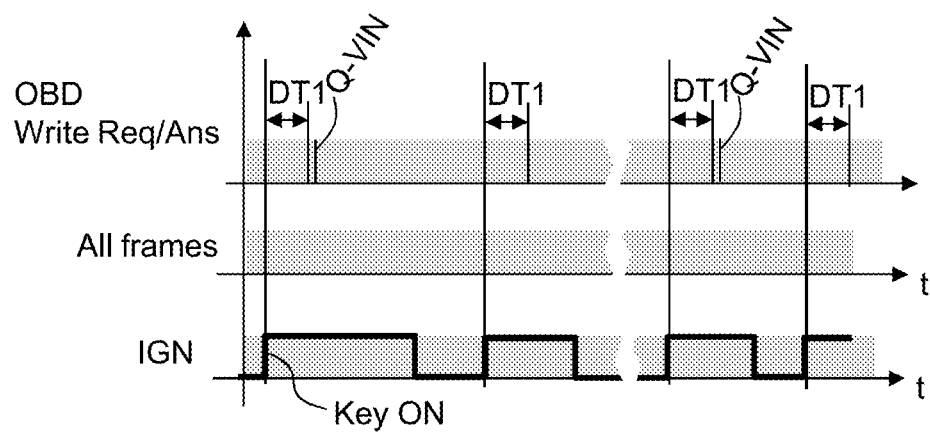
FIG. 9 illustrates several Key-On cycles

FIGS. 5, 7, 9 illustrate a summary of the steps involved in the method.

/a/ detect a Bus Active condition, either via an electrical pin on the diagnosis plug ('Key On') or via an analysis of activity level on at least one Diagnosis bus accessible at the diagnosis plug, /b/ cause the diagnosis plug-in device to listen only on the Diagnosis bus after the Bus Active condition is detected, ('passive mode') starting at time T1, /c/ determine a write enable condition, according to evolution of bus load level on the diagnosis bus and/or time elapsed since Bus Active condition was true.

Thereafter, one of the following process /dx/ is carried out:

/d1/ determining vehicle type, and defining therefrom a firewall filter, said firewall being subsequently used at step /e/ to inhibit certain request/answer services as described in detail below.

/d2/ determining vehicle type, wherein for certain particular vehicle type, the write enable condition is disabled.

/d3/ determine vehicle type, then /d4/ provide a database of overall bus load reference overall timecharts per vehicle type, each timechart exhibiting eras of low bus load and eras of high bus load, then /d5/ write requests at moments when the bus load is of low bus load.

Thereafter, the following process is carried out:

/e/ whenever the write enable condition becomes true (at time T2), carry out the request/answer services to write requests on the diagnosis bus and retrieve, in the corresponding answers, various data from the board ECUs 3, to be decoded and forwarded to a client fleet management system 6.

At step /e/, the process can be refined as follows:

/e1/ determining, on a short term basis, a cyclic pattern of messages circulating on the bus, with at least busy instants IB and quiet instants IQ, /e2/ place write requests on the diagnosis bus at quiet instants IQ.

Regarding steps /a/ to /c/, stated otherwise, the diagnosis plug-in device remains silent after Bus Active condition becomes true. Additionally, the diagnosis plug-in device may remain silent after engine crank to avoid writing request during the disturbed period under cranking.

As illustrated at FIG. 4, the determination of vehicle type can follow different possible tracks, either with VIN or with the help of frame profile.

Bus Load Reference Timecharts and Bus Occupation

Figure 10:
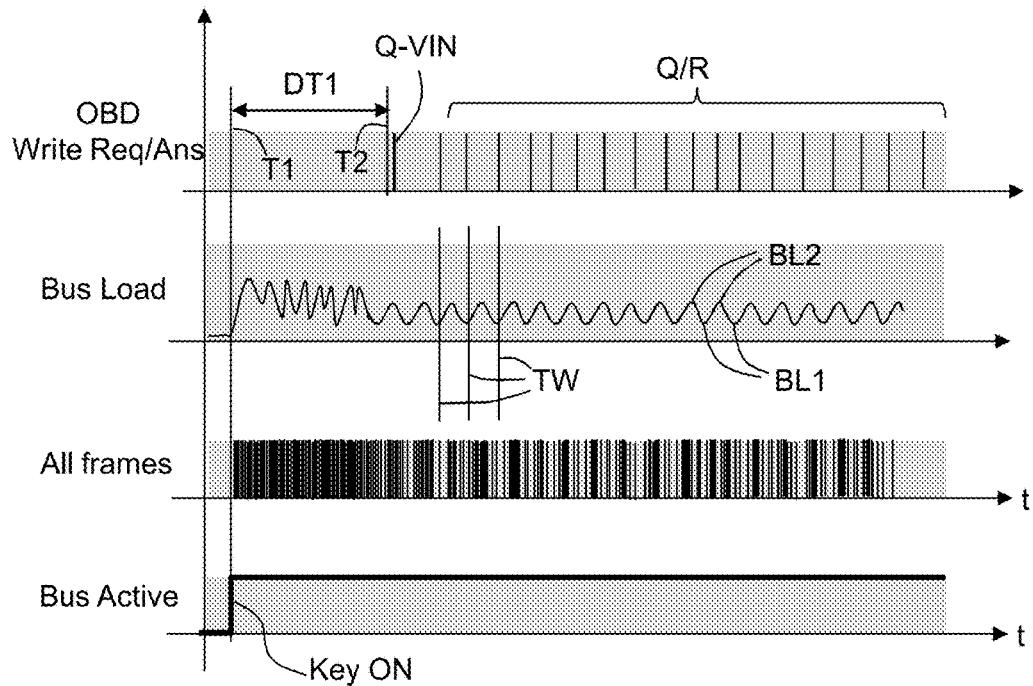
FIG. 10 illustrates a bus load timing chart.
Figure 11A:
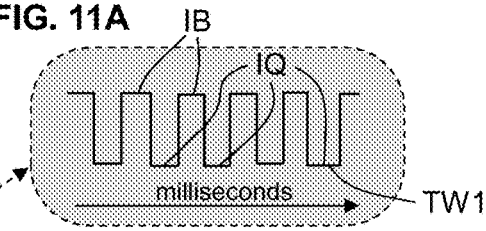
FIG. 11A illustrates a short term cyclic pattern.
Figure 11:
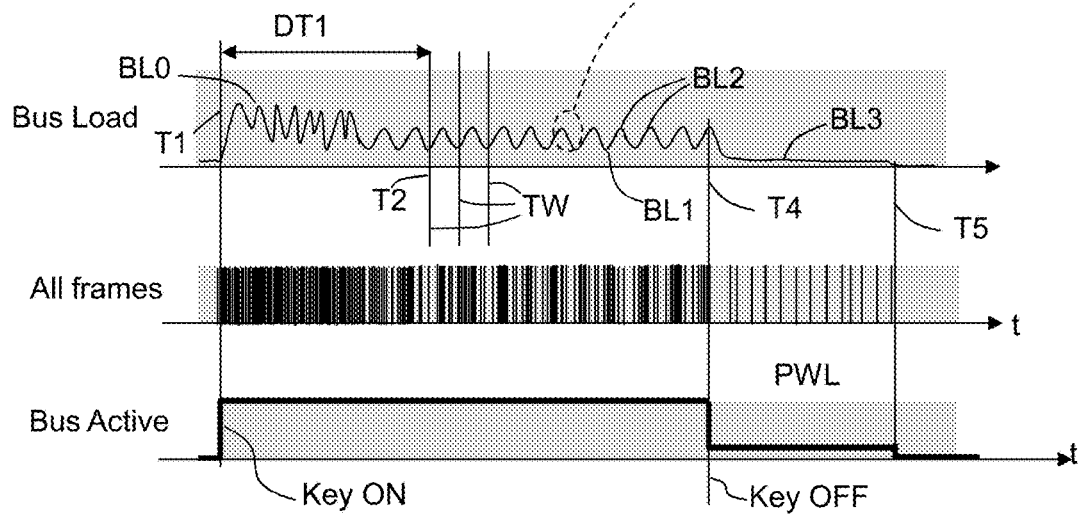
FIG. 11 illustrates a bus load timing chart, including a power latch phase.

As shown on FIGS. 10 and 11, the general bus load exhibits a surge BL0 just after Bus Activation, and after that, bus load exhibits oscillations, with eras of relative high bus load denoted BL2 and eras of relative lower bus load denoted BL1, which are considered in a rather 'long' term perspective (tenth of seconds, seconds). A Bus load reference timechart can be provided externally or learned incrementally. When provided externally, the Bus load reference timechart may indicate a particular frame ID to serve as synchronization to spot higher and lower bus load eras therefrom.

FIG. 11A shows a similar standpoint but from a short term perspective, with a cyclic pattern of messages circulating on the bus, comprising at least busy instants IB and quiet instants IQ. In one particular illustrated example, bus occupation level simply alternates between busy instants IB and quiet instants IQ, however the pattern can be more complicated with intermediate occupation level and or several different repetition frequencies.

Considering the short term perspective, it is preferred to place write requests on the diagnosis bus at quiet instants IQ (step /e2/) at moments denoted TW1.

Considering the 'long' term perspective, it is preferred to choose write instants, denoted TW, that correspond to the lower bus load.

Of course, a refined process can be carried out which takes into account both long-term and short-term perspectives.

Use of a short-term cyclic patterns and/or a long term bus load reference timechart helps placing the write requests, for example, just after a real-time detected transition [busy instant IB to quiet instant IQ], or if relevant, after a real-time detected transition [high bus load BL2 to lower bus load BL1].

Short-term cyclic patterns, as well as long term bus load reference timecharts, can be established for the particular considered vehicle, after the first driving cycle with the diagnosis plug-in device connected, or after some initial driving cycles with the diagnosis plug-in device connected. There is provided an incremental learning process.

In order to minimize the risk of disturbance on the diagnosis bus, the frequency of request from the diagnosis plug-in device can be advantageously adjusted.

The rate can be slowed down with the increase of vehicle speed.

Alternately, the request from the diagnosis plug-in device can be put on hold whenever the vehicle speed exceeds a predefined threshold. This threshold can be chosen for example in the range 40 Km/h-90 Km/h.

As shown at FIG. 11, at the end the bus cycle, there may be a so-called power latch phase PWL.

Usually the bus load BL3 is reduced as from instant T4. The bus activity ceases completely at time T5.

Frame Profiles Incremental Database

The host server 2 houses a lookup table 22 that contains many items of frame profiles concerning a great number of vehicle manufacturer technical platforms, another lookup table, which is called here a diagnosis stacks dataset database 23 at the host server, which comprises, for each recorded vehicle type VT, a diagnosis stacks dataset or a link thereto. Each time one plug In device encounters a new vehicle (with a correct VIN), and get the OBD stacks dataset, the corresponding frame profile is appended to the incremental lookup table 22, and possibly a new record is added to the diagnosis stacks dataset database 23.

Availability of Key on Signal, Bus Active Condition ON and OFF

Sometimes, an electrical signal reflecting "ignition on" is available at the OBD port.

However, in most cases, such electrical signal is not available, the OBD plug-in device 1 compensate by monitoring the number of messages circulating on the bus; for example, it can be decided that when a mean number of CAN frames per time unit increases more than a predefined threshold, then ignition has been set.

Said otherwise, a Bus Active condition is determined to be true when, on at least one accessible bus (the bus of interest in practice), a mean number of frames per time unit increases more than a first predefined threshold.

Conversely, a Bus Active condition is determined to become false, wherein a mean number of frames per time unit becomes lower than a second predefined threshold.

Firewall Filter

A firewall filter may be used at step /e/ to inhibit certain request/answer services define in the diagnosis stacks dataset. The reason for this is that some vehicle types may suffer some functional troubles whenever certain requests are placed on the bus. The purpose of the firewall filter is to prevent such troubles.

Therefore, a firewall filter is defined with regard to a vehicle type and contains the list of requests that must not be used on this vehicle type.

Said otherwise, a "total" firewall filter corresponds to disabling all requests.

Contextual use of request(s) can be combined with the use of firewall filter

Power Supply Interruption

The power supply of the diagnosis plug-in device 1 may be interrupted if the diag plug-in device 1 is physically disconnected from the diag port 8 (for example in case of Scan Tool momentary connection), or if the battery of the vehicle happens to be disconnected.

Whenever the power supply of the diagnosis plug-in device 1 has been interrupted, the frame profile determination and/or the VIN request sequence is carried out again at the next Bus Active condition. If the VIN/frame profile is not different from the previously stored VIN/frame profile then the previously used diagnosis stacks dataset is taken again, and optionally, the firewall filter also.

Otherwise, if there is a difference, the whole process of determining the vehicle type is carried out from the VIN and/or from the frame profile; and then the process of determining the diagnosis stacks dataset is carried out as mentioned above.

Besides, it may be decided that if the power supply of the diagnosis plug-in device has been maintained, the frame profile determination is not done repeatedly at each Bus Active condition.

The invention claimed is:

1. A method carried out in a system, the system comprising at least a diagnosis plug-in device connected to the diagnosis plug of a vehicle, a host server, one or more on-board Electronic Control Units coupled to the diagnosis plug, wherein the diagnosis plug-in device is wirelessly coupled to the host server, the method comprising the following steps:

/a/ detect, at the diagnosis plug-in device, a Bus Active condition, either via an electrical pin on the diagnosis plug or via an analysis of activity level on at least one Diagnosis bus accessible at the diagnosis plug, /b/ cause the diagnosis plug-in device to listen only on the at least one Diagnosis bus after the Bus Active condition is detected, /c/ determine, at the diagnosis plug-in device, a write enable condition, according to evolution of bus load level on the at least one diagnosis bus and/or after a certain time elapsed since the Bus Active condition was true, wherein the write enable condition is set to not become true before a listen-only period of time since the Bus Active condition was true, and the listen-only period of time DT1 is predefined and comprises between 1 second and 20 seconds, wherein no request is sent on the Diagnosis bus by the diagnosis plug-in device during the listen-only period of time, /e/ whenever the write enable condition becomes true, carry out, at the diagnosis plug-in device, firstly a Vehicle Identification Number query request (Q-VIN) and then one or more request/answer services to write requests on the diagnosis bus and retrieve, in the corresponding answers, various data from the one or more on-board Electronic Control Units, to be decoded and forwarded to a client fleet management system, via the host server.

2. The method of claim 1, further comprising:

/e1/ determining a cyclic pattern of messages circulating on the bus, with at least busy instants (IB) and quiet instants (IQ), where at busy instants the bus load is above a bus load threshold and at quiet instants the bus load is below the bus load threshold, /e2/ place write requests on the diagnosis bus at quiet instants (IQ).

3. The method of claim 1, wherein requests from the diagnosis plug-in device are put on hold whenever a current speed of the vehicle exceeds a predefined threshold.

4. The method of any of claim 1, further comprising:

/d1/ determining vehicle type, and defining therefrom a firewall filter, said firewall filter being subsequently used at step /e/ to inhibit certain request/answer services.

5. The method of claim 1, further comprising the step of /d2/ determining vehicle type, wherein for certain particular vehicle type, the write enable condition is disabled.

6. The method of claim 1, further comprising:

/d3/ determine vehicle type, namely Make/Model/Year/Powertrain,

/d4/ provide a database of overall bus load reference overall timecharts per vehicle type, each timechart exhibiting eras of low bus load and eras of high bus load, where the high bus load is defined as being above a bus load threshold and the low bus load defined as being below the bus load threshold, /d5/ write requests at moments when the bus load is of low bus load.

7. The method of claim 5, wherein the step of determining vehicle type is made either from a Vehicle Identification Number retrieved from the bus and/or from a frame profile determined according to characteristics of the received frame-IDs on the diagnosis bus.

8. The method of any of claim 1, wherein the diagnosis bus of interest is a Controller Area Network-type bus, at a bit rate of 250 kbits/s or 500 kbits/s.

9. The method of any of claim 1, wherein a Bus Active condition is determined to be true when, on at least one accessible bus, a mean number of frames per time unit increases more than a first predefined threshold.

10. The method of claim 9, wherein a Bus Active condition is determined to become false, wherein a mean number of frames per time unit is lower than a second predefined threshold.

11. A plug-in device configured to:
/a/ detect a Bus Active condition, either via an electrical pin on the diagnosis plug or via an analysis of activity level on at least one Diagnosis bus accessible at the diagnosis plug,
/b/ cause the diagnosis plug-in device to listen only on the at least one Diagnosis bus after the Bus Active condition is detected,
/c/ determine a write enable condition, according to evolution of bus load level on the at least one diagnosis bus and/or after a certain time elapsed since the Bus Active condition was true, wherein the write enable condition is set to not become true before a listen-only period of time since the Bus Active condition was true, and the listen-only period of time DT1 is predefined and comprises between 1 second and 20 seconds, wherein no request is sent on the Diagnosis bus by the diagnosis plug-in device during the listen-only period of time,
/e/ whenever the write enable condition becomes true, carry out, at the diagnosis plug-in-device, firstly a Vehicle Identification Number query request (Q-VIN) and then one or more request/answer services to write requests on the diagnosis bus and retrieve, in the corresponding answers, various data from one or more on-board Electronic Control Units, to be decoded and forwarded to a client fleet management system, via a host server.

12. A system comprising at least a diagnosis plug-in device connected to the diagnosis plug of a vehicle, a host server, one or more on-board Electronic Control Units coupled to the diagnosis plug, wherein the diagnosis plug-in device is wireless coupled to the host server where the system configured to:
/a/ cause detection, at the diagnosis plug-in device, of a Bus Active condition, either via an electrical pin on the diagnosis plug or via an analysis of activity level on at least one Diagnosis bus accessible at the diagnosis plug,
/b/ cause the diagnosis plug-in device to listen only on the at least one Diagnosis bus after the Bus Active condition is detected,
/c/ determine, at the diagnosis plug-in device, a write enable condition, according to evolution of bus load level on the at least one diagnosis bus and/or after a certain time elapsed since Bus Active condition was true, wherein the write enable condition is set to not become true before a listen-only period of time since the Bus Active condition was true, and the listen-only period of time DT1 is predefined and comprises between 1 second and 20 seconds, wherein no request is sent on the Diagnosis bus by the diagnosis plug-in device during the listen-only period of time,
/e/ whenever the write enable condition becomes true, carry out, at the diagnosis plug-in device, firstly a Vehicle Identification Number query request (Q-VIN) and then the request/answer services to write requests on the diagnosis bus and retrieve, in the corresponding answers, various data from the one or more on-board Electronic Control Units, to be decoded and forwarded to a client fleet management system, via the host server.

13. The system of claim 12, further comprising:
/e1/ determining, on a short term basis, a cyclic pattern of messages circulating on the bus, with at least busy instants (IB) and quiet instants (IQ), where at busy instants the bus load is above a bus load threshold and at quiet instants the bus load is below the bus load threshold,
/e2/ place write requests on the diagnosis bus at quiet instants (IQ).

14. The method of claim 1, wherein requests from the diagnosis plug-in device exhibit a rate which is slowed down with an increase of vehicle speed.

15. A method carried out in a system, the system comprising at least a diagnosis plug-in device connected to the diagnosis plug of a vehicle, a host server, one or more on-board Electronic Control Units coupled to the diagnosis plug, wherein the diagnosis plug-in device is wireless coupled to the host server, the method comprising the following steps:
/a/ detect, at the diagnosis plug-in device, a Bus Active condition, either via an electrical pin on the diagnosis plug or via an analysis of activity level on at least one Diagnosis bus accessible at the diagnosis plug,
/b/ cause the diagnosis plug-in device to listen only on the at least one Diagnosis bus after the Bus Active condition is detected,
/c/ determine, at the diagnosis plug-in device, a write enable condition, according to evolution of bus load level on the at least one diagnosis bus and/or after a certain time elapsed since Bus Active condition was true, wherein the write enable condition is set to not become true before a listen-only period of time since the Bus Active condition was true, and the listen-only period of time DT1 is predefined and comprises between 1 second and 20 seconds, wherein no request is sent on the Diagnosis bus by the diagnosis plug-in device during the listen-only period of time,
/e/ whenever the write enable condition becomes true, carry out, at the diagnosis plug-in device, firstly a Vehicle Identification Number query request (Q-VIN) and then one or more request/answer services to write requests on the diagnosis bus and retrieve, in the corresponding answers, various data from the board Electronic Control Units, to be decoded and forwarded to a client fleet management system, via the host server,
further comprising the step of
/d2/ determining vehicle type, wherein for certain particular vehicle type, the write enable condition is disabled,
wherein the step of determining vehicle type is made from a frame profile determined according to characteristics of the received frame-IDs on the diagnosis bus.

16. The method of claim 15, wherein the frame profile is defined as a collection of datasets: (frame-ID, frequency, DLC) where DLC is a Data Length Code.

17. The method of claim 15, wherein the frame profile comprises a first sub profile prevailing with IGNITION ON and Engine OFF condition, and a second sub profile prevailing with Engine Running condition.

18. The method of claim 1 wherein, when the vehicle is moving at a current speed, a rate of requests from the diagnosis plug-in device is caused to be dependent on the current speed.

19. The method of claim 15 wherein requests from the diagnosis plug-in device exhibit a rate which is slowed down with an increase of vehicle speed.

* * * * *